Nov. 8, 1966 — P. C. THEODORIDES — 3,283,937
OUTLET BOX WITH OPPOSED WALL ENGAGING MEANS
Filed May 7, 1964
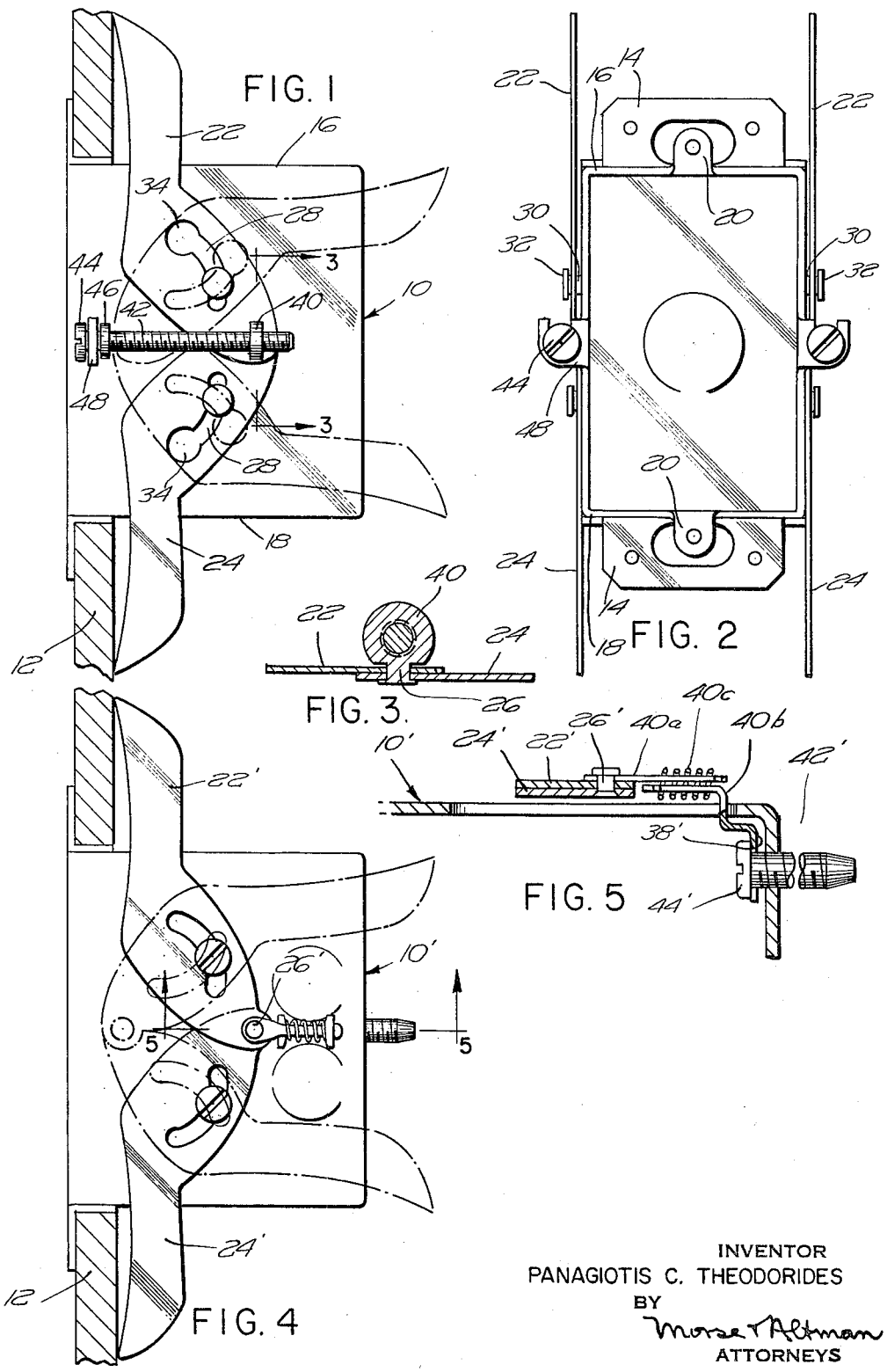
INVENTOR
PANAGIOTIS C. THEODORIDES
BY
Morse & Altman
ATTORNEYS

United States Patent Office 3,283,937
Patented Nov. 8, 1966

3,283,937
OUTLET BOX WITH OPPOSED WALL
ENGAGING MEANS
Panagiotis C. Theodorides, Boston, Mass.
(623 River St., Mattapan, Mass.)
Filed May 7, 1964, Ser. No. 365,633
5 Claims. (Cl. 220—3.6)

This invention relates to a clamping device for outlet boxes which are customarily mounted in an opening through the wall of a room, the open end of the box being flush with the surface of the wall. When a box has been installed and an electrical device such as a switch or an outlet socket has been mounted in the box, an escutcheon plate is secured to the open end of the box. As the plate is of larger dimensions than those of the open end of the box, its margins extend over the adjacent areas of wall surface and thus prevent the box from being pushed too far into the wall when the means which fasten the box to the wall are not secure, but in such case the box is apt to work loose so that the plate comes away from the wall and the box assembly is wobbly. An object of the invention is to provide means which can be inserted through the hole in the wall in which the box is to be mounted and may be operated to engage the inner surface of the wall adjacent to the hole to clamp the box firmly in place. For an understanding as to how this is to be done, reference may be had to the following description of preferred embodiments thereof, and to the drawing, of which FIGURE 1 is a side elevation of an outlet box with a clamping device attached to a side thereof mounted in an aperture in a wall;

FIGURE 2 is a front elevational view of the box shown in FIGURE 1;

FIGURE 3 is a section on the line 3—3, on a larger scale;

FIGURE 4 is a side view of a box having a modified form of clamping device thereon; and FIGURE 5 is a section on the line 5—5 of FIGURE 4, on a larger scale.

An electrical outlet box 10 is shown in FIGURE 1 in the position it usually occupies when mounted on a wall 12 by means of the adjustable brackets 14 customarily attached to the top 16 and bottom 18 of the box adjacent to its open end which is substantially flush with the surface of the wall 12 when the box is in place. As usual, ears 20 are provided at the top and bottom edges of the open end of the box to support the sockets, switch or other device which is to be mounted in the box. The aperture through the wall 12 into which the box is inserted is usually made just large enough to receive the box easily. A little extra width is allowable but clamping means attached to the outside of the box should be flat so as to pass through the aperture without requiring undue widening of the aperture for that purpose.

According to the invention, the clamping means at each side of the box comprises two thin fingers 22, 24 made of sheet metal and pivotally connected to each other at one end by a pin 26. Each finger has an arcuate slot 28 therethrough. A fixed pin 30 with a wide head 32 projects from the wall of the box through each slot 28 to serve as a pivot about which the respective finger can be rocked in its own plane. An opening 34 slightly larger than a pin head 32 may be provided at an end of each arcuate slot 28 for assembling the fingers 22, 24 on the box or removing them therefrom. The fingers are adapted to be swung between a retracted position (indicated by broken lines in FIGURE 1) in which they are entirely between the planes defined by the top and bottom of the box, and an expanded position (indicated by full lines) in which they project beyond the planes of the top and bottom of the box to engage the rear surface of the wall in which the box is mounted.

In the retracted position the fingers can be introduced with the box through the aperture in the wall, after which the fingers are rocked to the expanded position wherein they extend above and below the top and bottom of the box and press against the rear surface of the wall. This rocking movement is brought about by moving the pivot pins 26 toward the rear of the box. For this purpose each pin 26 is made with a nut 40 attached thereto. A screw 42 is threaded through each nut and is held against axial movement relative to the box by two flanges 44, 46 which are on either side of an ear 48 projecting from a side of the box. As shown, the flange 44 is also the head of the screw 42 which is adapted to receive a tool by which the screw is turned. Each ear 48 may have a hole therethrough for the screw 42, or, as indicated in FIGURE 2, a notch to receive the portion of the screw between the flanges 44 and 46. The screw can then be easily removed from the ear for quick axial movement to swing the fingers 22, 24 from their retracted position to an expanded position in which their free ends are near the rear face of the wall 12. Before pushing the screw rearward to swing the fingers to the expanded position, it is rotated to move the nut 40 away from the head 44 to a position about as shown in FIGURE 1. Then when the screw is pushed to swing the fingers to an expanded position, the neck of the screw between the head 44 and flange 46 will be in the plane of the ear so that the screw can enter the notch in the ear. Further turning of the screw by a tool will rock the fingers 22, 24 into firm engagement with the rear surfaces of the wall 12. Ordinarily that will complete a permanent installation of the box, but if a removal or replacement of the box should be desired, the screws 42 can be rotated in the other direction to release the clamping engagement of the wall by the fingers. Then the screws can be moved out of the notches in the ears 48 and pulled forward to swing the fingers to their retracted position, thus permitting the removal of the box from the wall after other fastening means have been disengaged.

FIGURES 4 and 5 illustrate a modified form of the invention. The box 10' is provided with fingers 22', 24' on each side, these fingers being attached to the box by broad-headed screws 30' which extend through arcuate slots 28' in the fingers. The fingers of each pair are pivoted together at 26'. To rock the fingers, a link extends from the pivot through an elongated slot 36' and terminates in a fork 38' which straddles a screw 42' within the box. This screw is threaded through the rear wall of the box. When the screw is turned, the head 44' of the screw pushes the fork 38' and the pivot 26' toward the rear, thus rocking the fingers 22', 24' to the expanded position for engagement with the rear surface of the wall 12. The link extending from the pivot 26' to the fork 38' may be a single piece or may be a resilient assembly comprising two T-shaped elements 40a and 40b. A helical spring 40c surrounds the shanks of the T shaped elements and presses against the crosses of the T's. The element 40a is attached to the pivot pin 26'. The element 40b is integral with the fork 38'. With this structure, the screw 42' can be driven further to the rear after the fingers engage the rear surface of the wall 12, thus leaving less of the screw itself within the box and providing more space therein for the wiring, etc. in the box.

I claim:
1. An electrical outlet box having clamping means on two sides thereof, the means on each side comprising a pair of fingers rockably attached to a side of the box, said fingers being pivotally connected to each other at one end thereof, and actuating means operable from in front of the box to rock said fingers from a position in which the ends of the fingers opposite from the pivoted ends are between planes defined by the top and bottom of the box to positions beyond said planes and adjacent to the plane of the open end of the box.

2. An electrical outlet box with clamping means as described in claim 1, each said finger having an arcuate slot therethrough, and a fixed pivot element for each said slot projecting outward from said box through its respective slot.

3. An electrical box with clamping means as described in claim 2, said actuating means including a nut at said pivotally connected ends of said fingers, a screw in threaded engagement with said nut, and means restraining said screw from axial movement relative to said box when it is rotated.

4. An electrical outlet box with clamping means as described in claim 3, said restraining means comprising an ear projecting from a side of said box and engaging said screw, said screw having two flanges between which is the portion of the screw engaged by said ear.

5. An electrical outlet box with clamping means as described in claim 4, said ear having a notch therein to receive the portion of said screw between said flanges.

References Cited by the Examiner
UNITED STATES PATENTS

| | | | |
|---|---|---|---|
| 1,328,968 | 1/1920 | Russell. | |
| 1,793,187 | 2/1931 | Neall | 220—3.6 |
| 2,155,627 | 4/1939 | Welch | 220—3.6 |
| 2,770,385 | 11/1956 | Schultz | 220—3.6 |

THERON E. CONDON, *Primary Examiner.*

JAMES R. GARRETT, *Examiner.*